3,228,305
ELECTRO-PNEUMATIC DIGITAL POSITIONER
Donald F. Wills, Suffield, Conn., assignor to Chandler Evans Inc., West Hartford, Conn., a corporation of Delaware
Filed Mar. 19, 1964, Ser. No. 353,137
8 Claims. (Cl. 91—378)

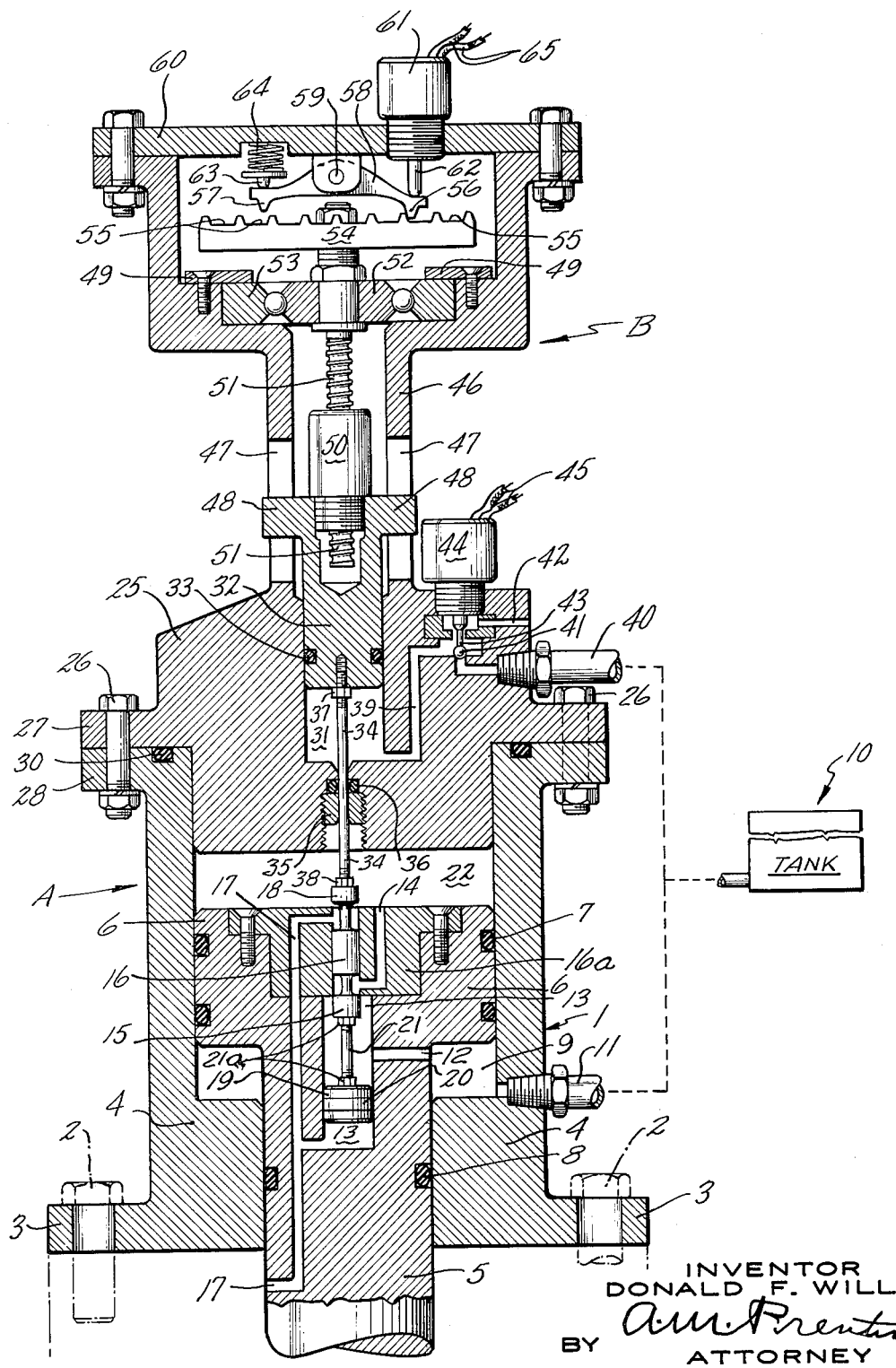

This invention pertains to apparatus for positioning a valve, or other movable element, for controlling the sequential steps of an industrial process; and more particularly has reference to devices for actuating such movable elements in accordance with electronic pulses received from a digital computer, or other similar source for such energy, which devices operate directly from the output signals from such a source.

The disclosed invention was devised to meet the need of the Process Control Industry for a low-cost positioner for positioning movable control elements and which operates directly from the output signals of a digital computer, or other source of electronic pulses. This type of positioning device is required for a recently developed mode of process control, called "Direct Digital Control." For this mode of control, a digital computer, operating in conjunction with process variable sensors and control positioners, controls a complete industrial process. The use of a digital computer, on a "shared-time" basis, to sample a measured control variable, and control the flow in each loop of a controlled process, eliminates the need for a large number of loop components which are required with analog control of each loop. This results in a lower plant installation cost, and better control of the process, and also obtains a higher quality product and more efficient raw material usage.

At the present time, there are available only a few types of digital control actuators, such as: Electric Pulse Actuators; Digital Pneumatic Valve Positioners, which are electro-pneumatic; Digital Control Actuators, which are all electric; and Digital Servo-actuators, which are electrohydraulic.

Operating experience with these control actuators has proved to be unsatisfactory, since they fail to meet the requirements of the Process Control Industry for a low cost control element positioner which is capable of operating directly from the output signal of a digital computer or other like source of electric pulses.

A new device is required as the control actuator for the direct digital control concept, because none of the available analog type actuators are satisfactory. The required device must accept digital output signals from a computer, in the form of electric pulses at various pulse frequencies, and convert each one of these pulses into a corresponding incremental movement of a valve, or other movable control element.

The actuator of my invention solves these fundamental problems by using a two-stage device. The first stage comprises an electrical detent device that responds to electric pulses received directly from a digital computer, and controls the movement of a second stage which comprises a pneumatic force amplifier, which converts the incremental position changes of the first stage into corresponding positions of a valve stem, or other movable control element.

An object of my invention is to devise an electro-pneumatic digital actuator, which is capable of meeting the above-mentioned requirements of the Process Control Industry.

Another object of my invention is to provide a low cost electro-pneumatic digital actuator for precisely moving a process control valve, or other movable element; said actuator being of greatly simplified design, and construction, and having the requisite characteristics to meet the requirement of the Process Control Industry.

A further object of my invention is to provide a digital control actuator, which is capable of accepting electronic pulse signals directly from a digital computer, operating in conjunction with a process control valve, or other movable process control element, to control an entire production process.

With these and other objects in view, which may be incident to my improvements, my invention comprises apparatus for performing a desired series of sequential steps, and having a combination and arrangement of elements, as hereinafter described and illustrated in the accompanying drawing, which shows, in central vertical section, a preferred embodiment of my invention.

As shown in the drawing the actuator of my invention broadly comprises two connected assemblies of elements, viz: (A) a pilot valve assembly (shown in the lower part of the drawing; and (B) a solenoid detent assembly (shown in the upper part of the drawing).

As shown in the lower part of the drawing, the pilot valve assembly (A) comprises a stationary cylindrical casing 1, secured to the processing machine to be controlled by bolts 2 which pass through a flange 3 of casing 1, and engage in the body of the controlled machine. Suitably mounted in base 4 of casing 1 is an output shaft 5, integral with a load piston 6, which are maintained in slidable, fluid-tight relation to the casing 1 and base 4, respectively by O-rings 7 and 8. A chamber 9 between piston 6 and base 4 is supplied with an elastic fluid (e.g. gas or air), under a controlled pressure, from a source 10, through a conduit 11, which tends to move the piston upwardly.

Fluid from chamber 9 flows through a passage 12 into a cylindrical bore 13 in piston 6, and escapes through a passage 14 into a chamber 22 in the upper part of casing 1. When the lower end of passage 14 is opened by the downward movement of the bottom land 15 of a spool pilot valve 16, fluid enters from tank 10 through conduit 11, chamber 9, passage 12, chamber 13, passage 14, to chamber 22, where it exerts a downward thrust on piston 6 and output member 5. Whenever the upper end of passage 17 is opened, by the upward movement of land 18 of pilot valve 16, this permits escape of fluid from chamber 22, lowers the pressure therein, which allows piston 6 to move upwardly by the force of fluid pressure in chamber 9, until such movement closes the upper end of passage 17 by alignment with land 18 of pilot valve 16, whereupon piston 6 comes to rest and remains in its new position, so long as passage 17 is closed by land 18. Lands 15 and 18 of pilot valve 16 are held in adjustable relation to each other by the intervening portion of valve 16, so that when the lower end of passage 14 is closed by land 15, the upper end of passage 17 is opened by land 18; and vice versa.

Slidably mounted in the lower end of bore 13 is a bias piston 19, which is sealed in fluid tight contact with bore 13 by an O-ring 20, and is adjustably connected to land 15 of pilot valve 16 by a rod 21 and a pair of lock nuts 21a.

As shown in the upper part of my drawing, the solenoid detent assembly B comprises a base portion 25, which is secured to the upper end of pilot valve assembly A, by bolts 26, which clamp a flange 27, on the lower end of base portion 25, to a mating flange 28, on the upper end of pilot valve assembly A, with a fluid-tight contact by reason of an interposed O-ring 30.

Base portion 25 is provided with a central, cylindrical bore 31, in which a pilot piston 32 reciprocates with a fluid-tight fit by virtue of an interposed O-ring 33. Piston 32 is adjustably attached to pilot valve 16 by a rod 34, which passes through gland nut 35 and O-ring 36, and is secured to piston 32 by a lock nut 37, and to valve 16 by a lock nut 38, which permits adjustment of the position of land 16.

The lower end of bore 31, below piston 32, is connected by a passage 39 and conduit 40 to source 10 of fluid under pressure, whereby, when the upper end of conduit 40 is opened by the upward movement of a ball valve 41, said fluid flows from source 10, through passage 39, into the lower end of bore 31, and exerts an upward thrust on piston 32.

Ball valve 41 is connected by a stem 43, and is moved as a unit by a reversing solenoid 44, which is energized by an electronic pulse direction-signal, transmitted through lead wires 45 from an electronic computer, or other suitable source of such energy (not shown). When solenoid 44 is energized by an electronic signal pulse, received through wires 35, it raises ball valve 41 from its seat on the upper end of conduit 40, and seats it on the inner end of a conduit 42, which communicates with the outside atmosphere. This permits fluid under pressure to flow into chamber 31 through passage 39 and exert an upward thrust on pilot piston 32. Correspondingly, when solenoid 44 is de-energized by the absence of an electronic pulse, ball valve 41, closes conduit 40 and opens passage 42, which permits the escape of fluid under pressure from bore 31 through passage 42. With the consequent reduction of fluid pressure in bore 31, pilot piston 32 will tend to be lowered by the downward thrust of bias piston 19, which is attached to piston 32 by rods 21 and 34 and pilot valve 16.

Upon the reverse movement of ball valve 41 from its lower to its upper position, as previously described, fluid under pressure enters bore 31 (and ceases to escape through conduit 42), whereupon pilot piston 32 overcomes the downward thrust of bias piston 19, because of the larger area of piston 32, tending to move the pilot piston 32 in an upward direction.

Integral with the upper end of base portion 25 is a tubular extension 46, having a pair of oppositely disposed slots 47—47, wherein a pair of lugs 48—48, integral with pilot piston 32, reciprocate, and prevent any rotation of piston 32, and ball screw nut 50 which is fixedly attached to said piston. Nut 50 is provided internally with a plurality of balls which engages (with rolling friction) in the threads of a ball screw shaft 51, to which is fixed the inner race 52 of a ball thrust bearing 53. An annular flange member 49, fixed to the upper portion of tube 46, restrains ball bearings 52 and 53 from linear movement, so that the linear travel of ball screw nut 50 produces a rotation of screw shaft 51, and attached detent wheel 54, upon the linear movement of pilot piston 32 and attached screw nut 50.

Detent wheel 54 is provided with a plurality of radial detent notches 55 which are alternately engaged by one of a pair of prongs 56 and 57 of an escapement lever 58, which is pivoted at 59 to cover member 60, that closes the upper enlarged end of tubular extension 46.

Mounted in cover 60 is an indexing solenoid 61, which is provided with a plunger 62 that moves the right end of lever 58 and detent prong 56 downwardly into contact with one of the notches 55 of wheel 54, upon the energizing of solenoid 61 by an electronic pulse received through lead wires 65 from an electronic computer (not shown).

Upon the de-energizing of solenoid 61, prong 56 is moved upward out of engagement with the edge of a notch 55, by the downward movement of a disc 63 acted upon by a spring 64, which causes prong 57 to engage in a notch 55 in wheel 54, allowing said wheel to rotate 3 degrees of arc and thereafter holding said wheel stationary, until the next electronic pulse actuates solenoid 61, as previously described.

OPERATION

The above-described digital actuator is controlled by the command output signals from a digital computer. This command information is in the form of an Off-On directional signal, which controls the position of the reversing solenoid 44, valve 41, and a square wave signal of a selected frequency which is received by the detent solenoid 61. Each time solenoid 61 is energized and de-energized, the detent wheel 54 is free to travel 3 degrees of arc, and pilot valve 16 subsequently moves .001 inch. This motion of pilot valve 16 is followed by motion of the piston 6 to re-align itself with the pilot valve. This moves the process control valve stem to which the output shaft 5 of the actuator is connected by .001 inch. The direction of the above motions is controlled by the position of the reversing valve 41, as established by the computer directional command signal received by reversing solenoid 44. If the reversing valve 41 is in its lower position and passage 39 is open to outside atmosphere, the pressure on the pilot piston 32 is atmospheric and the incremental valve 16 movement is downward. If the reversing valve 41 closes passage 42, the piston 32 has full fluid pressure acting on it, and the incremental valve 16 movement is upward.

The follow-up action of piston 6 derives from the porting arrangement between the two sides of said piston through the pilot valve 16 and sleeve 16a. My basic actuator design could also be adapted to work as an electro-hydraulic digital actuator, by substituting a liquid for the elastic fluid (gas or air).

From the foregoing description of my invention, it will be seen that I have provided an actuator for accomplishing the direct digital control concept, for which none of the available analog type actuators are satisfactory, since the apparatus of my invention can accept digital output signals from a computer in the form of electric pulses at various pulse frequencies, and convert each one of these pulses into a corresponding incremental movement of a linearly movable valve, or other control element, which in turn controls the sequential steps of an industrial process.

My invention solves this fundamental problem by using a two-stage apparatus, wherein the first stage device B is a digital detent escapement device which is compatible with electrical input signals from a computer; and a second stage device A is a pneumatic force amplifier which converts incremental position changes of the first stage device B into corresponding changes in position of a valve stem, or other movable control element, that controls the desired industrial process.

From the foregoing description of the construction and operation of my invention, it is apparent that it provides improved and substantially simplified means for converting the linear thrust of a pneumatically actuated pilot piston 32 into a step increment rotary movement of a detent wheel 54, whose rate of movement is regulated by an escapement mechanism 54–64.

While I have shown and described the preferred embodiment of my invention, I desire it to be understood that I do not limit myself to the particular combination and arrangement of elements disclosed by way of illustration, as these can be altered and changed by those skilled in the art without departing from the spirit of my invention or exceeding the scope of the appended claims.

I claim:

1. A digital-computer pulse actuated positioner having a source of pressurized fluid, comprising: means receiving command signals in the form of digital electric pulses, at various frequencies, an output member; means including fluid actuated means bidirectionally operatively connected to said signal receiving means and said output means converting each of said command pulses into a corresponding incremental movement of said output member.

2. A positioner as in claim 1 in which said converting means, comprises: a two-stage positioning apparatus; wherein the first stage comprises an electrical stepping device compatible with said digital pulse signals; and the second stage comprises said fluid-actuated output member, and includes means operatively connected to said electrical stepping device and said output member.

3. A device as in claim 1, comprising: a two-stage positioning apparatus; wherein the first stage comprises an electrical bidirectional stepping device compatible with said digital output pulse signals; and the second stage comprises an elastic fluid-actuated output member, having means for converting the incremental position changes of said first stage device into corresponding incremental positions of said output member.

4. In combination, a bidirectiona pulse controlled positioning member, an output member, means for converting each pulse into a corresponding incremental movement of said output member, including a follow-up connection between said positioning member and said output member and additional means selectively urging said positioning member in either of two opposite directions to provide bidirectional movement.

5. A two-stage digital computer pulse actuated positioner having a source of pressurized fluid and an output member comprising; first stage electrical stepping means receiving command signals in the form of digital electrical pulses at various frequencies, a second stage comprising force amplifying means receiving fluid from said pressurized fluid source and positionable responsive to selective variations in said pressurized fluid, means directly connecting said force amplifying means to said output member, means including elements of said force amplifying means for reversing the direction of movement of said output member in obedience to a second electric pulse received directly from said digital computer, said means for amplifying and said means for reversing operatively connected to said signal receiving means and converting each of said command pulses into a corresponding fixed incremental movement of said output member.

6. A digital positioner as in claim 5 wherein said second stage force amplifying means comprises; a load piston directly connected to said positioner output member and reciprocated by said pressurized fluid, and a pilot valve reciprocally mounted in said piston and so constructed and arranged as to selectively apply fluid pressure to said piston thereby determining the direction of movement of said piston.

7. A digital computer pulse actuated two-stage positioner having a detent wheel comprising; a first stage electrical stepping device so constructed and arranged as to receive first electrical pulse signals at various frequencies directly from a digital computer and convert each pulse signal into a corresponding step movement of said detent wheel, a second stage comprising a source of pressurized fluid, an output member, a load piston directly connected to said output member, said load piston receiving fluid from said pressurized fluid source and directly applying the force generated by said fluid on said piston to said output member, a pilot valve reciprocally mounted in said load piston and so constructed and arranged as to selectively apply fluid pressure to the load piston thereby determining the lineal direction of movement of said load piston, a pilot piston receiving pressurized fluid from a pressure source and directly connected to said pilot valve, means intermediate said source of pressure fluid for said pilot valve and said pilot piston for reversing the direction of movement of said pilot piston in obedience to second electric pulse signals received from said digital computer, means connecting said pilot piston to said first stage stepping device such that each incremental lineal position change of said pilot piston is converted into a corresponding incremental rotary position change of said detent wheel.

8. A digital computer pulse actuated positioner having a detent wheel comprising; a first stage electrical stepping device so constructed and arranged as to receive electrical pulse signals at various frequencies directly from a digital computer and convert each pulse signal into a corresponding step movement of said detent wheel, said detent wheel being provided with a series of radial notches which are alternately engaged by one of a pair of prongs on opposite ends of an escapement lever such that each incremental rotation of said detent is limited to the space between each adjacent pair of notches, a second stage comprising a source of pressurized fluid, an output member, a load piston directly connected to said output member, said load piston including means receiving fluid from said pressurized fluid source and directly applying the force generated by said fluid on said piston to said output member, a pilot valve reciprocally mounted in said load piston and so constructed and arranged as to selectively apply fluid pressure to the load piston thereby determining the lineal direction of movement of said load piston, means intermediate said source of pressurized fluid and said load piston for reversing the direction of movement of said load piston in obedience to a second electric pulse signal received from said digital computer, a pilot piston directly connected to said pilot valve, means connecting said pilot piston to said first stage stepping device such that each incremental lineal position change of said pilot piston is converted into a corresponding incremental rotary position change of said detent wheel.

References Cited by the Examiner
UNITED STATES PATENTS

| | | | |
|---|---|---|---|
| 978,706 | 12/1910 | Davidson | 251—138 |
| 1,557,944 | 10/1925 | Reisbach | 93—93 |
| 1,719,898 | 7/1929 | McNeil | 251—138 X |
| 1,846,362 | 2/1932 | Schellens | 91—376 |
| 2,207,921 | 7/1940 | Huxford | 251—31 X |
| 2,574,335 | 11/1951 | Leduc | 91/370 |
| 2,992,633 | 7/1961 | Stiglic et al. | 91—376 X |

M. CARY NELSON, *Primary Examiner.*